United States Patent [19]
Berchtold

[11] 3,989,794
[45] *Nov. 2, 1976

[54] PROCESS OF MANUFACTURING FERRITE BODIES OF LOW POROSITY

[75] Inventor: Jean Berchtold, La Jolla, Calif.

[73] Assignee: Eastman Kodak Company, Rochester, N.Y.

[ * ] Notice: The portion of the term of this patent subsequent to Apr. 6, 1993, has been disclaimed.

[22] Filed: May 18, 1973

[21] Appl. No.: 361,698

Related U.S. Application Data

[63] Continuation of Ser. No. 104,563, Jan. 7, 1971, abandoned, which is a continuation-in-part of Ser. No. 103,480, Jan. 4, 1971, abandoned.

[52] U.S. Cl. .............................. 264/332; 252/62.56; 252/62.59; 264/65
[51] Int. Cl.² ................... C04B 35/60; C04B 35/26
[58] Field of Search ............... 264/DIG. 58, 65, 332; 252/62.56, 62.59

[56] References Cited
UNITED STATES PATENTS

| | | | |
|---|---|---|---|
| 2,990,602 | 7/1961 | Brandmayr | 264/66 |
| 3,383,737 | 5/1968 | Greger | 264/65 |
| 3,573,208 | 3/1971 | Brockman et al. | 264/DIG. 58 |

FOREIGN PATENTS OR APPLICATIONS 747,292 9/1966 Canada .............................. 264/65

*Primary Examiner*—Donald J. Arnold
*Assistant Examiner*—John Parrish
*Attorney, Agent, or Firm*—Bernard D. Wiese

[57] ABSTRACT

A process for preparing ferrite materials exhibiting an excellent combination of physical and magnetic properties is disclosed. In this process a ferrite powder is formed and subsequently sintered while exerting a mechanical pressure of about 5 to about 500 kg. per square centimeter on the ferrite. The oxygen content of the ferrite is maintained substantially stoichiometric throughout the process by controlling the oxygen content of the ambient atmosphere. Temperatures in the range of about 1100° to about 1400° C during sintering are disclosed. New ferromagnetic ferrite compacts which can be prepared by this process are characterized by an oxygen content which is substantially stoichiometric and a porosity no greater than about 0.4%.

9 Claims, 4 Drawing Figures

FIG. 3
FIG. 4
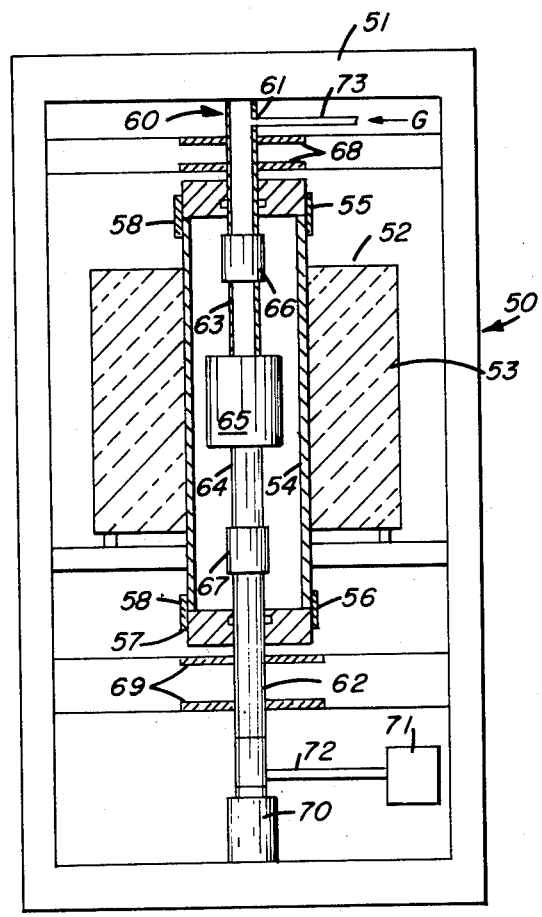
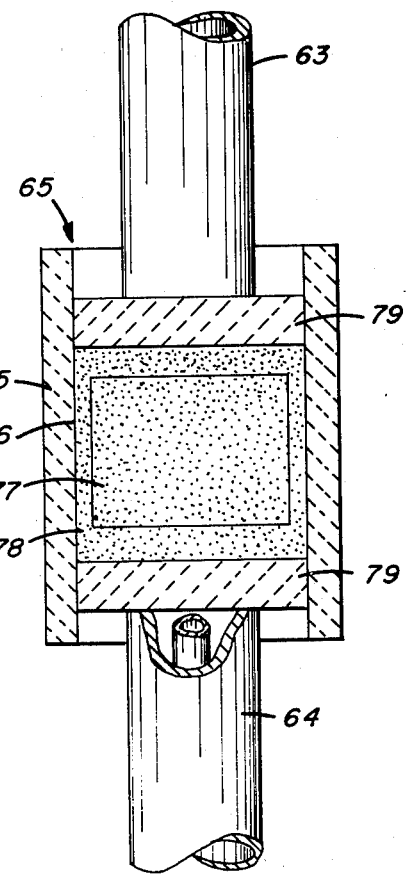

PROCESS OF MANUFACTURING FERRITE BODIES OF LOW POROSITY

This application is a continuation of application Ser. No. 104,563 filed Jan. 7, 1971, entitled, "Process of Manufacturing Ferrite Bodies of Low Porosity", now abandoned, which in turn is a continuation-in-part of application Ser. No. 103,480, filed Jan. 4, 1971, entitled "Process of Manufacturing Ferrite Materials With Improved Magnetic and Mechanical Properties", now abandoned.

BACKGROUND OF THE INVENTION

Field of The Invention

The present invention relates to processes of manufacturing magnetic materials and, more particularly, to the production of ferrite bodies having reduced porosity, improved mechanical and magnetic properties and, thus, highly suitable for use as magnetic recording heads and microwave devices but not limited to such application; to such material; and to magnetic recording heads and microwave devices produced from such materials.

The Terminology Used in the Specification

Units in the following are metric and abbreviations conform to the International System of Units (SI). In addition, the following popular symbols and their corresponding meanings are used in the text:

| | |
|---|---|
| $\mu i$ | initial permeability at low frequency |
| $\mu i(f10)$ | initial permeability at 10 MHz |
| $f(Q1)$ | frequency where $Q = 1$ |
| Hc | coercivity (Oersted) |
| Pv | visual porosity in percent of visual pore area to total field area evident on a polished microscopic sample at a magnification of 500×. |
| min | minute |
| h | hour |
| d | day |
| torr | pressure of column of 1 mm of mercury |

DESCRIPTION OF THE PRIOR ART

Ferrites are commonly produced by a solid state reaction performed at high temperature on a mixture of oxides of the constituent metals. The ferrite material obtained is subsequently milled, pressed into the desired shape and heated to sinter temperature to produce solid ferrite bodies.

Several factors limit the degree of porosity of products thus obtained. Since no attempt is made to achieve the correct oxygen stoichiometry before sintering, the ferrite formation at that stage is incomplete and the product non-homogeneous.

The deviations of such oxygen stoichiometry are the driving forces for ionic migration and segregation of a foreign oxidic phase not compatible with the ferrite crystal structure. Contaminants like iron particles shed from milling equipment and organic binder, added purposely, are reducing agents causing the zinc ion content to redistribute itself or escape as elemental zinc. Oxidizing conditions favor the formation of non-ferrite oxides such as: $Fe_2O_3$, $Mn_3O_4$, $Mn_2O_3$ and $Co_3O_4$.

The decrease of surface energy of crystallites constitutes the main driving force during the regular sintering process, causing ferrite bodies to densify. The energy available is thus very limited and decreases rapidly while sintering progresses and crystallites increase in size and decrease in surface area. The redistribution of ionic inhomogeneities, particularly segregations, as are evident in non-stoichiometric material, is a slow process and requires activation energies comparable to that of the surface energy of the starting powder.

It is thus understandable why ferrite bodies produced according to conventional methods exhibit large porosities of typically 3 to 10 percent.

A method of continuous hot pressing was described by G. J. Oudemans in Philips Tech. Rev. 29, 45–53 (1968 No. 2) and in Proc. Brit. Ceram. Soc. 12, 83–98 (1969), wherein ferrite powder is compacted in a step repeat manner at high temperatures. The process is practically limited, however, to bodies of grain sizes comparable to that of the starting powder, due to the short time available for grain growth. For the same reason, and reasons covered above, porosity is limited to values of 0.6 to 1 percent. In addition, the method is not suitable for processing of ferrite materials susceptible to oxidation, as for instance, manganese zinc ferrite, since the operation is effected in air and a correct oxygen stoichiometry cannot be obtained.

Other known processes of hot pressing of ceramics which use graphite dies in a batch wise manner are not applicable to ferrites since the latter would be chemically reduced by the interaction with the graphite and destroyed at the temperatures required for sintering.

SUMMARY OF THE INVENTION

Accordingly, it is an object of the invention to provide a process for manufacturing ferrite bodies having reduced porosity, improved mechanical and magnetic properties such as are desirable for use in magnetic recording heads and microwave devices.

It has been found according to the invention that porosity of ferrite bodies can be strongly reduced while mechanical and electrical properties are improved by exerting a mechanical pressure on the ferrite body during sintering.

It has been further found that the best properties are produced when a homogeneous ferrite powder of virtually identical oxygen stoichiometry to that of the final product is used as starting material for sintering and when this oxygen stoichiometry is preserved throughout the sinter process.

Another advance according to the invention is obtained by avoiding direct contact of the ferrite from the die and pads used to contain and compress the ferrite by a liner of refractory powder.

The invention and other objects and many of the attendant advantages of the invention will become apparent by reference to the following detailed description.

BRIEF DESCRIPTION OF THE DRAWINGS

A preferred process of my invention can be suitably carried out using equipment such as illustrated in the accompanying drawings in which:

FIG. 3 is a somewhat diagrammatic elevational view, partly in section of apparatus for carrying out the simultaneous or concurrent steps of sintering and pressing the prefired or calcined ferrite material processed in the apparatus of FIG. 1; and FIG. 4 is an enlarged fragmentary, vertical sectional view of the die assembly of FIG. 3 for carrying out the combined heating and pressing steps.

DETAILED DESCRIPTION OF THE PREFERRED EMBODIMENTS

The invention relates to all steps of maufacturing having a determining effect on the mechanical and magnetic properties of the final ferrite material.

The complete ferrite process can functionally be split in two main groups of operation, that dealing with the production of a homogeneous ferrite powder of correct oxygen stoichiometry and that of densifying this powder by hot pressing.

Production of Stoichiometric Ferrite Powder

In the preferred form of the invention, pure metal compounds are blended in the desired proportions and milled in an alumina ball mill (high density alumina jar and media) as a water slurry.

As an illustrative example, a composition A is prepared from the following amount of pure oxides:

| | |
|---|---|
| 1520 g | $Fe_2O_3$ |
| 415 g | $Mn_2O_3$ |
| 263 g | ZnO |

Composition B is prepared from the following amounts of pure compounds.

| | |
|---|---|
| 1380 g | $Fe_2O_3$ |
| 528 g | $MnCO_3$ |
| 295 g | ZnO |

Composition C is prepared from the following amounts of pure oxides:

| | |
|---|---|
| 1460 g | $Fe_2O_3$ |
| 248 g | NiO |
| 7 g | CoO |
| 489 g | ZnO |

Mixtures of the above compounds are milled for two hours with 3.5 liters of water in a 13 liter ball mill charged with 15 kg alumina balls of from 10 to 20 mm diameter. The slurry produced is dewatered by filtering with a Buchner-type funnel with vacuum.

A granulation is performed here for ease of handling the material through the calcining furnace. Granulation may be done by any of the common methods not requiring a binder. According to the preferred embodiment of the invention, the partially dewatered material is extruded with a screw extruder through a perforated plate. The extruded material so obtained is then dried, crushed and screened, and fractions containing particles between 0.5 and 4 mm are retained for further processing.

Calcining is preferably performed as a continuous operation in order to ensure a high level of homogeneity of the oxygen content.

Figure 1:
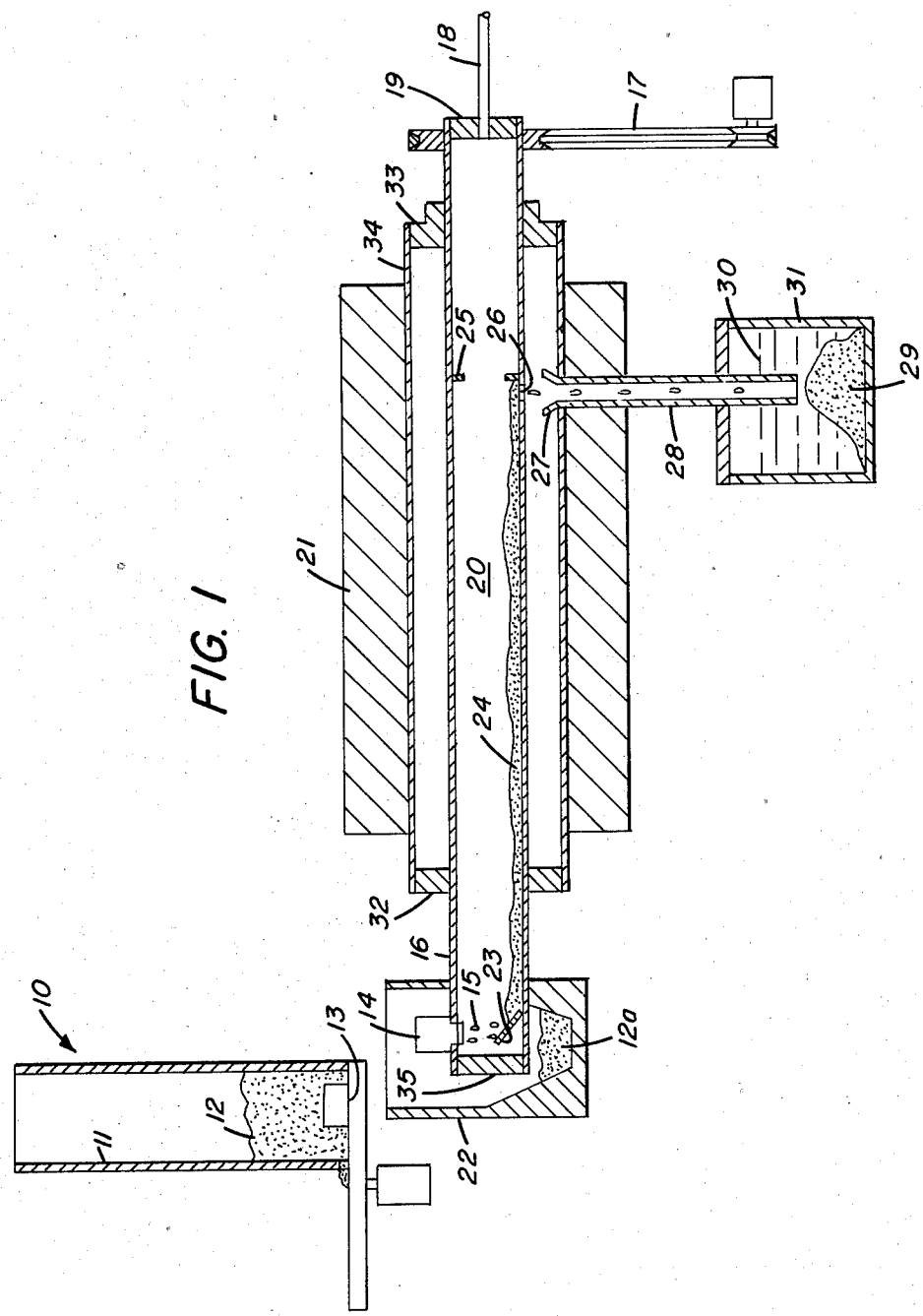
FIG. 1 shows a sectional view through a rotary kiln as used under the preferred embodiment of the invention for calcining ferrite under well defined conditions of oxidation level.

With regard to FIG. 1, the reference numeral 10 indicates generally a feeding unit comprising a storage container 11 for containing the source material, which in this case is a mixture 12 of metallic compounds. From the storage container 11, the mixture 12 is gravity discharged in metered amounts through a table feeder 13 into a lower stationary hopper 22, from which the mixture is fed, in a manner about to be described, into one end of a rotary ceramic tube 16. Said tube 16 constitutes a rotary kiln, being provided at its other end with a driving mechanism, indicated generally, by the reference number 17. A gas supply conduit 18 serves to feed a supply of the desired gas mixture axially through a rotary seal 19 into the interior 20 of said ceramic tube 16.

The tube 16 is surrounded by and supported within a stationary electrical tube furnace 21 that includes a muffle tube 34 coaxial with and of larger diameter than said tube 16. Rotary seals 32 and 33 seal the annular spaces between the ends of the tube 16 and the muffle tube 34. At its feed end the kiln is closed by a plug 35.

As the tube 16 is revolved, a scoop 14 picks up mixed compounds from the accumulation 12a of the mixture in the stationary hopper 22 and transfers them into the interior 20 of the tube 16 to fall in a stream 15 against a downwardly and forwardly sloping shelf 23. As the kiln revolves, the mixture falls off of the inclined shelf 23 and is subjected to a rotating and tumbling action that causes the mixture to spread out into an axially advancing layer 24 moving countercurrently with respect to the flow of gas from the inlet 18. An inner annular baffle 25 positioned toward the gas inlet end of the tube 20 causes the advancing layer 24 of the hot calcined product to fall by gravity through an opening 26 provided upstream of the baffle in the wall of the tube and to pass downwardly into the flared upper end 27 of a downchute 28. The chute 28 delivers the hot ferrite into a vessel 31 below the level 30 of a quenching liquid therein, which is usually water. The quenching liquid provides a gas seal. The quenched mixture builds up into a heap 29 below said level 30, from which the mixture is removed for further processing.

Typical numerical data for a rotary kiln such as described above are as follows:

| | |
|---|---|
| Inside diameter of calcine tube | 30 mm |
| Length of hot zone | 80 mm |
| Kiln inclination | 1:30 |

For the three above-mentioned compositions the following conditions were used:

| | A | B | C |
|---|---|---|---|
| Furnace temperature, °C | 1100 | 1050 | 1150 |
| Gas Composition (Vol. percent) | $N_2$ | $N_2$ + 0.05% $O_2$ | $N_2$ + 1% $O_2$ |
| Gas Flow Rate, l/min | 2 | 2 | 1 |
| Speed of rotation, min$^{-1}$ | 1 | 1 | 0.6 |
| Feed rate, kg/d | 2 | 2 | 1 |

-continued

| | A | B | C |
|---|---|---|---|
| Furnace temperature, °C | 1100 | 1050 | 1150 |
| Effective residence time, h | 3 | 3 | 5 |

Because manganese is present as the sesqui-oxide in the starting material of Composition A, this mixture exhibits an excess of oxygen over that required for the finished ferrite product. The gas composition chosen is pure nitrogen. Calcine conditions, in particular temperature, residence time and gas flow rate are chosen empirically such that oxygen is given off in the desired amount to yield a stoichiometric ferrite without zinc loss.

Compositions B and C do not require the removal of excess oxygen; hence a small content of oxygen is provided in the atmosphere to counteract zinc dissociation. As mentioned above, the calcined material is discharged into water, which furnishes a convenient gas seal. The calcined material is strained and fractured by the thermal shock produced by the quenching in water. The action, of course, is due to the thermal expansion change obtained from the sharp temperature differential. The introduction of stresses at this point is useful as it makes the subsequent milling operation more efficient and reduces contamination level from milling.

The ferrite granules obtained from the calcining operation are milled in an alumina ball mill to a maximum particle size of 5 - 10μ. Milling is performed upon a water slurry of the ferrite granules without addition of any binder, surfactant or viscosity modifier as is currently customary in the art.

The alumina pickup from the mill can be kept to such a very low level typically under 0.5% by weight as to be of no practical consequence to the ferrite properties. It is, of course, desirable to keep the alumina content small since its addition will reduce the saturation magnetization of the ferrite by displacing a corresponding amount of ferric ion. It is advisable to reduce the iron content of the initial formulation by that amount on a mol basis in order to maintain stoichiometry.

The milled material is dewatered, preferably by filtering and drying, and the dry filtered cake obtained is then crushed, screened and processed in the hot press assembly of FIG. 3 and the die of FIG. 4.

Hot Pressing Operation

In FIG. 3 the reference numeral 50 indicates a hot press assembly having an enclosing frame 51, within which is mounted an electrical tubular furnace 52, which may be of any suitable construction, surrounding an axially extending muffle tube 54, the upper and lower extremities 55 and 56 of which extend above and below the end faces of furnace wall 53. The upper and lower ends of said muffle tube 54 are closable by cooperating sliding seals 57 and static seals 58.

A composite ram, designated as a whole by the reference numeral 60, is mounted axially of the muffle tube 54. Said ram 60 comprises an upper metal tube 61, a lower metal tube 62, an upper ceramic tube 63 and a lower ceramic tube 64, with a mold assembly 65 in operative alignment with said ceramic ram tubular portions 63 and 64 and with sleeves 66 and 67 cemented or otherwise fixedly joined as couplers to the contiguous ends of said corresponding metal and ceramic tubes in order to form upper and lower composite ram structures. Upper ram guide bearings 68 and lower ram guide bearings 69 serve to mount composite ram 60 for limited axial movement of the lower metal tube 62 relative to the upper metal tube 61.

A hydraulic cylinder, schematically illustrated at 70, controllably functions to exert the desired pressure upon the sintered material to be hot pressed within the mold assembly 65 in a manner later to be described herein in greater detail. A vacuum pump 71 is connected by a line 72 to the interior of the lower ram tube 62 to draw up gases therefrom at any desired rate of flow. Such gases may be those introduced through an intake 73 into the upper ram tube 61 for the desired atmosphere in the mold assembly 65.

The mold assembly 65 is illustrated in greater detail in FIG. 4, wherein the mold proper comprises a high strength ceramic cylinder 75 which may suitably be formed of a highly refractory material such as dense alumina, silicon nitride, silicon carbide, or other material capable of withstanding pressures in excess of 1000 lbs. per square inch at temperatures in excess of 1200° C. The pressure obtained by the relative motion of ram tubes 63 and 64 is transferred to the preformed ferrite compact 77 through pads 79. The latter are preferably formed of refractory material similar to that of the die.

While the inner surface 76 of the cylindrical die wall 75 can be employed as the surface of the mold, or die, it is preferable to surround the ferrite compact 77 with a layer of a refractory granular powder, indicated at 78, such as calcined alumina. Such material does not sinter at the temperature required for hot pressing ferrite and prevents adherence between ferrite and die material. This is desirable to prevent stresses and fractures from differential thermal expansion of ferrite and ceramic die during cooling and to enable easy removal of the ferrite body from the ceramic die at the end of the hot pressing operation.

The ferrite slugs obtained are then sintered according to the invention under conditions maintaining the oxygen stoichiometry. As mentioned before, an oxygen pressure (or partial pressure) in the atmosphere surrounding the ferrite material in excess of that of the desired ferrite product will oxidize the ferrous content of the ferrite material, whereas an oxygen deficiency will cause zinc ferrite to dissociate and zinc to be lost irreversibly. At any temperature in the temperature cycle used, the optimum oxygen pressure is a compromise between the minimum pressure required to prevent a significant loss of zinc and the maximum pressure tolerable to minimize oxidation of the ferrite.

Figure 2:
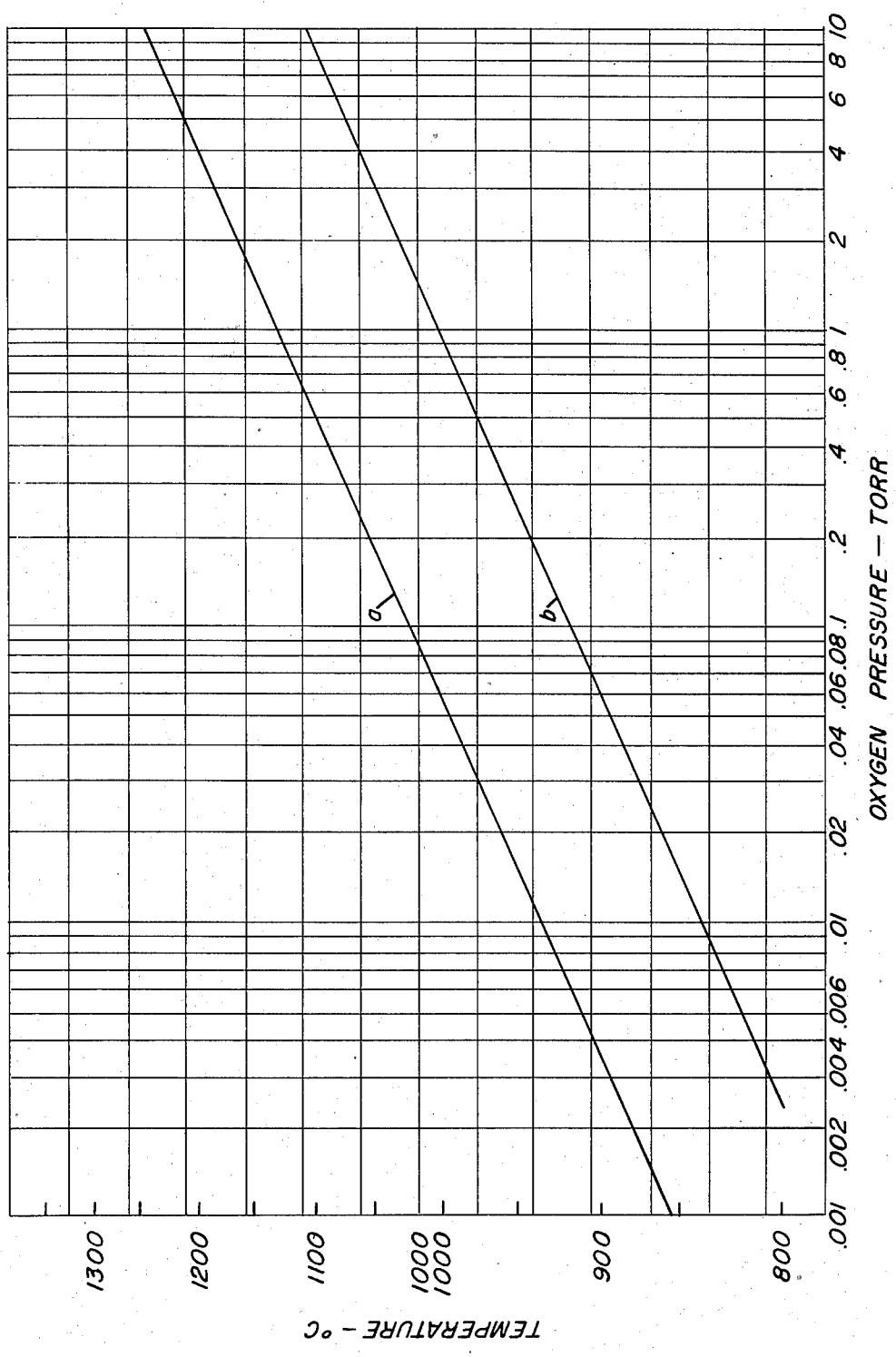
FIG. 2 shows plots of equilibrium oxygen pressure versus temperature as used for the atmosphere during sintering of manganese zinc ferrite and nickel zinc ferrite.

Plot a of FIG. 2 shows a typical graphical representation of the relation between oxygen pressure (or oxygen partial pressure) and temperature that is followed for sintering manganese zinc ferrite according to this invention as applied to compositions A and B. The described function is useful for all manganese zinc ferrite of practical compositions and enables the operator to maintain the ferrous content of such ferrite at a level of 90 to 94% of the stoichiometric value without detectable loss of zinc. In the language of this description, such ferrite is deemed to be virtually stoichiometric.

Plot b of FIG. 2 shows the corresponding relations used for nickel zinc ferrites containing a small amount of cobalt, e.g., for composition C described above.

A practical lower limit to the atmosphere control is set by the accuracy of controlling a very low concentration or flow rate. Commercial nitrogen for instance has a typical oxygen content of 0.002%, and can be considered as already oxidizing for manganese zinc ferrite at temperatures under 700° C. Requirements with respect to strict accuracy of atmosphere control are, however, minimized at low temperatures by the reduced rates of reaction and diffusion.

The atmosphere control can be effected by two different methods, both giving equally good results: one, by using pure oxygen under reduced pressure and adjusting such pressure in relation to the temperatures; or, two, by feeding a continuous stream of a non-reactive gas such as nitrogen at atmospheric pressure, admixing with said nitrogen stream controlled amounts of oxygen or air and adjusting the partial pressure of oxygen in said admixed stream in accordance with the temperature. In either case the adjustments as to pressure, or partial pressure of oxygen are made on the basis of plotted curves such as shown on FIG. 2.

Dense ferrite bodies are produced by sintering the preferred ferrite material at pressures within the range of from 5 to 500 kg/cm² and at temperatures within the range of from 1100° to 1400° C. A maximum sinter temperature of 1220° C maintained for 2 h while compressed in a ceramic die at a pressure of 100 kg/cm² imparts to a ferrite mixture, such as that of Composition A, the following properties:

| | |
|---|---|
| $\mu i$ | 1200 |
| $\mu i(f10)$ | 450 |
| $f(Q1)$ | 8 MHz |
| Hc | 0.2 |
| Pv | 0.15% |

The above values are substantially more favorable than those of commercial ferrite produced by prior art processes. Also the bend strength of polished samples (2700 kg/cm²) is higher than that of porous ferrite by a factor of 2 to 4. The maximum porosity of finished ferrite parts produced by my process is smaller than 0.4%.

In general, ferrite materials that are particularly suited for manufacture in accordance with my invention have compositions expressed in mol percents of their metal oxide contents as follows:

| Manganese Zinc Ferrite | |
|---|---|
| Metal Oxides | Mol Percent |
| $Fe_2O_3 + Al_2O_3$ | 49–55 |
| MnO | 20–38 |
| ZnO | 12–28 |

The $Al_2O_3$ content is not an essential ingredient but may be present as an impurity due to attrition of the ball mill or balls if formed of alumina.

| Nickel Zinc Ferrite | |
|---|---|
| Metal Oxides | Mol Percent |
| $Fe_2O_3 + Al_2O_3$ | 47–50 |
| NiO | 15–35 |
| ZnO | 15–35 |
| CoO | 0–2 |

Preferably, both the pre-firing, or calcining step, and the sintering step are carried out in temperature cycles wherein the pressure of the oxygen, whether total or partial pressure, is adjusted and maintained in relation to the temperature obtaining at a given instant during such temperature cycles so as to maintain the oxygen stoichiometry of the ferrite material. A plot such as that of the curves a and b of FIG. 2 serves as a guide line for the adjustment and maintenance of the proper oxygen pressure for a given temperatures at virtually the same level as that desired in the finished ferrite product.

It is to be understood that the foregoing only relates to exemplary embodiments of the invention and that numerous modifications, substitutions and deviations are possible without departing from the scope of the invention as defined in the following claims.

What is claimed is:

1. In a process for preparing a ferromagnetic ferrite in which a ferrite powder is formed and subsequently hot pressed, the improvement which comprises (1) controlling the oxygen pressure or partial pressure thereof in the ambient atmosphere during said formation of said ferrite powder so as to yield a ferrite powder having a substantially stoichiometric oxygen content and (2) controlling the oxygen pressure or partial pressure thereof in the ambient atmosphere through said hot pressing to maintain said substantially stoichiometric oxygen content of said ferrite powder while simultaneously exerting mechanical pressure of about 5 to about 500 kg. per square centimeter on said ferrite.

2. A process according to claim 1 in which said hot pressing is carried out at a temperature in the range of about 1100° to about 1400° C.

3. A process according to claim 1 in which said ferrite powder is formed from a mixture of metal oxides.

4. A process according to claim 3 in which said ambient atmosphere contains oxygen and also a gas nonreactive with said ferrite powder.

5. A process according to claim 1 in which said ferrite powder is quenched after formation but before hot pressed by discharging it beneath the surface of water.

6. A process according to claim 5 in which said mechanical pressure is at least about 100 kg. per square centimeter and is exerted at a temperature in the range of about 1100°to about 1400° C for about 1–12 hours.

7. A process according to claim 1 in which said mechanical pressure is exerted on said ferrite powder while it is confined within a refractory material selected from the group consisting of alumina, silicon nitride and silicon carbide.

8. A process according to claim 3 in which said ferrite powder is formed from a mixture of (1) $Fe_2O_3$, $Mn_2O_3$ and ZnO, (2) $Fe_2O_3$, $MnCO_3$ and ZnO or (3) $Fe_2O_3$, NiO, CoO and ZnO.

9. In a process for preparing a ferromagnetic ferrite in which a ferrite powder is formed and subsequently hot pressed, the improvement which comprises (1) controlling the oxygen pressure or partial pressure thereof in the ambient atmosphere during said formation of said ferrite powder so as to yield a ferrite powder which has a substantially stoichiometric oxygen content, (2) quenching said powder in water and (3) controlling the oxygen pressure or partial pressure thereof in the ambient atmosphere through said hot pressed to maintain said substantially stoichiometric oxygen content of said ferrite powder while simultaneously exerting mechanical pressure of about 5 to about 500 kg. per square centimeter on said ferrite powder.

* * * * *

UNITED STATES PATENT AND TRADEMARK OFFICE
CERTIFICATE OF CORRECTION

PATENT NO. : 3,989,794
DATED : November 2, 1976
INVENTOR(S) : Jean Berchtold

It is certified that error appears in the above-identified patent and that said Letters Patent are hereby corrected as shown below:

Title page, change Item [73] Assignee: from "Eastman Kodak Company, Rochester, N. Y." to -- Spin Physics, Inc., San Diego, California--.

Column 4, second line from bottom of page, change "Speed of rotation, min $^{1"}$ to read --Speed of rotation, min $^{-1}$--.

Column 8, line 33, after "ferrite" (last word in claim 1) add --powder--.

Column 8, line 43, change "pressed" to --pressing--.

Column 8, line 64, change "pressed" to --pressing--.

Signed and Sealed this

Fifteenth Day of February 1977

[SEAL]

*Attest:*

RUTH C. MASON
*Attesting Officer*

C. MARSHALL DANN
*Commissioner of Patents and Trademarks*